OR  3,704,057

United S

Beegle

[15] 3,704,057

[45] Nov. 28, 1972

[54] ELECTROCHROMIC DEVICE HAVING IDENTICAL DISPLAY AND COUNTER ELECTRODE MATERIALS

[72] Inventor: Lindley Clair Beegle, Darien, Conn.

[73] Assignee: American Cyanamid Company, Stamford, Conn.

[22] Filed: June 2, 1971

[21] Appl. No.: 149,301

[52] U.S. Cl. ...................................................350/160
[51] Int. Cl. .................................................G02f 1/36
[58] Field of Search ..........................350/160; 96/88

[56] References Cited

UNITED STATES PATENTS

| | | | |
|---|---|---|---|
| 3,317,321 | 5/1967 | Chopoorian | 96/88 |
| 3,521,941 | 7/1970 | Deb et al. | 350/160 |
| 3,578,843 | 5/1971 | Castellion | 350/160 |
| 3,443,859 | 3/1969 | Rogers | 350/160 |
| 3,283,656 | 11/1966 | Jones et al. | 350/160 |

Primary Examiner—William L. Sikes
Attorney—Charles J. Fickey

[57] ABSTRACT

An electro-optical device is provided which is useful in control of visible and infrared absorption by windows, data display devices and the like typically comprising an electrochromic material as the display area, the same type of electrochromic material serving as an electrode for the device.

6 Claims, 2 Drawing Figures

PATENTED NOV 28 1972 3,704,057

INVENTOR.
LINDLEY CLAIR BEEGLE
BY
Charles J. Hickey
ATTORNEY

ELECTROCHROMIC DEVICE HAVING IDENTICAL DISPLAY AND COUNTER ELECTRODE MATERIALS

This invention is directed to electro-optical devices whose electromagnetic radiation transmission characteristics can be selectively altered by the influence of a suitably controlled electrical field. More particularly this device relates to a system comprising electrochromic materials and conductive electrolyte which exhibit good chemical and electrochemical stability, reversibility and reproducibility. Still more particularly this invention is concerned with an electrochromic device having highly compatible counter-electrode.

The term persistent electrochromism denotes the property of a material whereby its electromagnetic radiation absorption characteristic is altered, in most instances even at ambient temperature, under the influence of an electric field. Such materials, for example, may exhibit little or no absorption of visible wave lengths in the absence of an electric field and therefore be transparent, but when subjected to an electric field, effectively absorb in the red end of the spectrum, turning blue in color. Similar effects can be observed in other portions of the electromagnetic radiation spectrum, invisible as well as visible.

If a layer of a persistent electrochromic material is disposed between a pair of electrodes, across which a potential is applied, the radiation transmitting characteristic of the material will change. If the electrodes and the electrochromic layer are formed on the surface of a transparent substrate, such as glass, the light transmitting characteristics of the combination can be varied by controlling the electric field produced across the electrochromic material. On the substrate which originally is clear, i.e., presenting substantially no diminution of the light transmitting ability of the substrate, application of a voltage between the electrodes to establish an electric field of the proper polarity changes the light absorption characteristic of the electrochromic material, turning it darker, for example, thus decreasing the light transmitting ability of the entire assembly.

In U. S. Pat. No. 3,357,930 it has been proposed to form electrically conductive transparent coatings from combination of salts in a polymeric matrix. However, these compositions suffer the disadvantage of relatively low electrical conductance insufficient to meet the stringent conductivity requirement of electrochromic device of the present invention wherein the gel must have a conductivity approaching 4M $H_2SO_4$.

In later developments in this area, (copending, commonly assigned applications Ser. No. 41,154, filed May 25, 1970, and Ser. No. 41,153, filed May 25, 1970, are described devices which employ liquid or semi solid conducting media such as liquid sulfuric acid, or lithium stearate greases. Although these devices are effective to change their electromagnetic radiation transmitting properties under the influence of an electric field the simple combination of electrodes, electrochromic materials and electrolyte was somewhat limited in application because in some cases the semi solid conducting greases were insufficiently electrically conductive to permit device operation at voltages below the decomposition potential of the electrolyte to avoid undesirable electrochemical side reactions. Similarly the use of a strong liquid sulfuric acid electrolyte while sufficiently conductive to permit low voltage operation was, however, not chemically compatible to prevent chemical attack on certain electrode materials such as porous lead, moreover, the liquid electrolyte had the disadvantages of containment inherent in a fluid.

In application Ser. No. 41,153, filed May 25, 1970, commonly assigned, are disclosed gelled, sulfuric acid–polymeric electrolytes such as $H_2SO_4$–PVA (polyvinyl alcohol) which possess high electrical conductivity and good chemical compatibility with the electrochromic films employed in the present device. In addition these gel electrolytes possess good stability, high viscosity and transparency. Further, the ease of device manufacture is facilitated by improved dimensional stability and self-sealing characteristic of the sulfuric acid polyvinyl alcohol gel employed.

In copending application, Ser. No. 41,155, filed May 25, 1970, commonly assigned, it was disclosed that the counter electrode could advantageously be composed of the same electrochromic material of which the display surface, or optical filter area is composed. Thus, for example, if the electrochromic material is a layer tungsten oxide, the counter electrode could also be tungsten oxide. It is desirable to have the character of both tungsten oxide materials as much alike as possible for best possible ionic transfer. However, this is difficult in that the tungsten oxides are individually deposited, and despite all efforts to control the character of the deposits, their character varies somewhat.

It is, therefore, an object of this invention to provide an electrochromic device wherein the counter electrode is of identical material and character as the main body of electrochromic material.

Another object is to provide a method for efficaciously forming an electrochromic layer and the counter electrode in an electrochromic device.

These and other objects will become apparent as the description thereof proceeds.

SUMMARY OF THE INVENTION

Briefly stated, the invention consists of forming a deposit of an electrochromic material on a conductive substrate such as NESA glass. A narrow portion of the deposit is then removed to cause separation between two areas of electrochromic materials. Thus what remains are two identical deposits of an electrochromic material, one of which may be used for the main electrochromic layer and the other for the counter electrode.

The foregoing and other features, objects and advantages of the present invention will become more apparent from the following detailed description.

As used herein, a "persistent electrochromic material" is defined as a material responsive to the application of an electric field of a given polarity to change from a first persistent state in which it is essentially non-absorptive of electromagnetic radiation in a given wave length region, to a second persistent state in which it is absorptive of electromagnetic radiation in the given wave length region, and once in said second state, is responsive to the application of an electric field of the opposite polarity to return to its first state. Certain of such materials can also be responsive to a short circuiting condition, in the absence of an electric field, so as to return to the initial state.

By "persistent" is meant the ability of the material to remain in the absorptive state to which it is changed, after removal of the electric field, as distinguished from a substantially instantaneous reversion to the initial state, as in the case of the Franz-Keldysh effect.

DETAILED DESCRIPTION OF THE INVENTION

Electrochromic Materials

Figure 1:
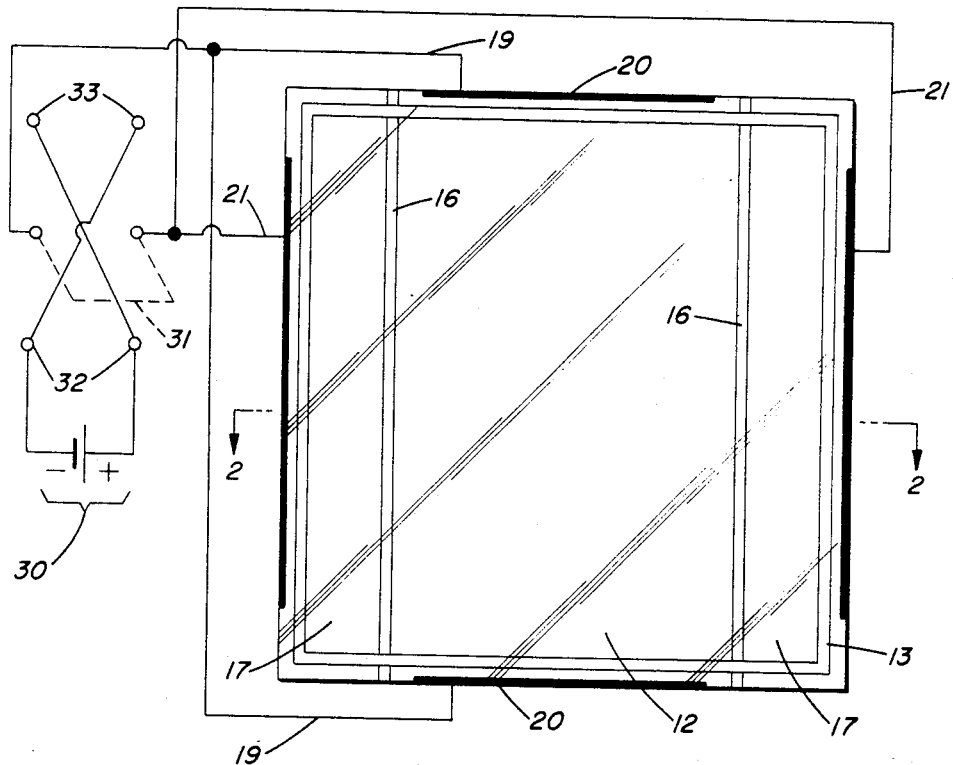

The materials which form the electrochromic materials of the device in general are electrical insulators or semi-conductors. Thus are excluded those metals, metal alloys, and other metal-containing compounds which are relatively good electrical conductors.

While not wholly understood, it appears that coloration of the electrochromic materials must be accompanied by the uptake of positive counterions provided in the electrolyte.

The persistent electrochromic materials are further characterized as inorganic substances which are solid under the conditions of use, whether as pure elements, alloys, or chemical compounds, containing at least one element of the Periodic System which can exist in more than one oxidation state in addition to zero. The term "oxidation state" as employed herein is defined in "Inorganic Chemistry," T. Moeller, John Wiley & Sons, Inc., New York, 1952. These include materials containing a transition metal element (including Lanthanide and Actinide series elements), and materials containing non-alkali metal elements such as copper. Preferred materials of this class are films of transition metal compounds in which the transition metal may exist in any oxidation state from +2 to +8. Examples of these are: transition metal oxides, transition metal oxysulfides, transition metal halides, selenides, tellurides, chromates, molybdates, tungstates, vanadates, niobates, tantalates, titanates, stannates, and the like. Particularly preferred are films of metal stannates, oxides and sulfide of the metals of Groups (IV)B, (V)B and (VI)B of the Periodic System, and Lanthanide series metal oxides and sulfides. Examples of such are copper stannate, tungsten oxide, cerium oxide, cobalt tungstate, metal molybdates, metal titanates, metal niobates, and the like.

Additional examples of such compounds are the following oxides: MO oxides (M representing the metal ion), e.g., MnO, NiO, CoO, etc.; $M_2O_3$ oxides, e.g., $Cr_2O_3$, $Fe_2O_3$, $Y_2O_3$, $Yb_2O_3$, $V_2O_4$, $Ti_2O_3$, $Mn_2O_3$, etc.; $MO_2$ oxides, e.g., $TiO_2$, $MnO_2$, $ThO_2$, $CrO_2$, etc.; $M_3O_4$ oxides, e.g., $Co_3O_4$, $Mn_3O_4$, $Fe_3O_4$, etc.; $MO_3$ oxides, e.g., $CrO_3$, $UO_3$, etc.; $M_2O_5$ oxides, e.g., $V_2O_5$, $Nb_2O_5$, $Ta_2O_5$, etc.; $M_4O_6$ oxides; $M_2O_7$ oxides such as $M_2O_7$; complex oxides such as those of the formula $XYO_2$ (X and Y being different metals), e.g., $LiNiO_2$, etc.; $XYO_3$ oxides, e.g., $LiMnO_3$, $FeTiO_3$, $MnTiO_3$, $CoTiO_3$, $NiTiO_3$, $LiNbO_3$, $LiTaO_3$, $NaWO_3$, etc.; $XYO_4$ oxides, e.g., $MgWO_4$, $CdWO_4$, $NiWO_4$, etc.; $XY_2O_6$, e.g., $CaNb_2O_6$ ("Niobite" oxides); $X_2Y_2O_6$, e.g., $Na_2Nb_2O_6$ Spinel structure oxides, i.e., of the formula $X_2YO_4$, e.g., $NaMoO_4$, $Ag_2MoO_4$, $Cu_2MoO_4$, $Li_2MoO_4$, $Li_2WO_4$, $Sr_2TiO_4$, $Ca_2MnO_4$, etc.; and $XY_2O_4$, e.g., $FeCr_2O_4$, $ilZn_2O_4$ etc.; $X_2YO_5$ oxides, e.g., $Fe_2TiO_5$, $Al_2TiO_5$, etc. For a discussion of some complex oxides, see Advanced Inorganic Chemistry, Cotten & Wilkinson, page 51, (1966), Interscience Publishers, Inc., New York and Progress in Inorganic Chem., Vol. 1, 465 (1959) Interscience Publishers, Inc., New York. Also included are nitrides, and the sulfides corresponding to the above oxides. Hydrates of certain metal oxides may also be used, e.g., $WO_3 \cdot H_2O$, $WO_3 \cdot 2H_2O$, $MoO_3 \cdot H_2$ and $MoO_3 \cdot 2H_2O$.

The preferred electrochromic material for use with the liquid electrolyte of the present invention is a compound which contains at least one element selected from Group VA, VIA, VIIA of the Periodic Table of the elements and at least one cation from Groups IB, IIB to VIIIB including Lanthanide and Actinide series. Particularly advantageous materials are $WO_3$ and $MoO_3$.

An important advantage of devices of the invention containing a stable sulfuric acid gel electrolyte in contact with electrochromic material is applicability to large uniformly colored areas. The invention, therefore, permits numerous practical applications where control of visible and infrared absorption is desired to which prior art electrooptical devices are not susceptible as for example windows in homes, commercial buildings and automobiles.

When the persistent electrochromic materials are employed as films, thickness desirably will be in the range of from about 0.1–100 microns. However, since a small potential will provide an enormous field strength across very thin films, the latter, i.e., 0.1–10 microns, are preferred over thicker ones. Optimum thickness will also be determined by the nature of the particular compound being laid down as films and by the film-forming method since the particular compound and film-forming method may place physical (e.g., non-uniform film surface) and economic limitations on manufacture of the devices.

The films may be laid down on any substrate which, relative to the film, is electrically non-conducting. Suitable substrate materials include glass, wood, paper, plastics, plaster, and the like, including transparent, translucent, opaque or other optical quality materials. A preferred embodiment in the instant device would employ at least one transparent electrode.

When the electric field is applied between the electrodes, a blue coloration of the previously transparent sandwich occurs, i.e., the persistent electrochromic layer becomes absorptive of electromagnetic radiation over a band encompassing the red end of the visible spectrum, thereby rendering it bluish in appearance. Prior to the application of the electric field, it was essentially non-absorbent and thus transparent.

Electrolyte

A liquid electrolyte is employed. The electrolyte can comprise an acid or salts thereof which are compatible with a counter electrode as discussed below and the electrochromic layer, such as the following:

1. Aqueous sulfuric acid solutions ranging from 0.1 to 12.0 molar.

2. Sulfuric acids solutions of propylene carbonate, acetonitrile, dimethyl formamide and other organic solvents compatible with sulfuric acid.

3. Strong organic acids, such as 2-toluene sulfonic acid, in propylene carbonate and other organic solvents.

4. Alkali metal or alkaline earth metals or rare earth metal salts, such as lithium perchlorate, nitrate, chloride, sulfate, etc., in organic solvents, such as acetonitrile and propylene carbonate.

A distinct advantage of the above-mentioned solvents is their dielectric and solubility properties leading to high conductivity and high capacity.

A semi-solid conductive electrolyte gel may also be employed. The electrolyte comprises in combination with sulfuric acid a gelling material for the acid. Any gelling agent which is compatible with the electrochromic layer is suitable. Particularly advantageous gelling agents are polyvinyl alcohol, polyacrylamide, ethylene glycol, sodium silicate, cabo-sil, and the like.

A thickening agent such as Purifloc A21 may optionally be employed.

A preferred embodiment employs $H_2SO_4$ in combination with polyvinyl alcohol. The properties of this gel may be varied in advantageous manner by employing polyvinyl alcohol of various molecular weights, differing sulfuric acid concentration and different polyvinyl alcohol to acid ratios. Thereby gel electrolytes can be produced to give a specific conductivity in the range of from about 0.10 to 0.60 $ohm^{-}\ cm^{-1}$.

A distinct advantage of the above mentioned gel electrolytes is their high ionic conductivity and good chemical stability. We have found that both requirements are unexpectedly met by gels in the preferred conductivity range of $0.20 - 0.40\ ohm^{-1}\ cm^{-1}$.

Other materials may be incorporated into the gel to vary the physical properties of the gel such as viscosity and vapor pressure. Thus the composition may optionally include organic solvents such as, dimethyl formamide, acetonitrile, proprionitrile, butyrolactone and glycerine.

Further, the gels used in the instant invention may be made opaque with, for example, polyhydric phenols such as gallic acid for use in certain electrochromic display device applications.

Counter Electrode

The invention may be better understood by reference to the drawings which show embodiments of the invention.

Figure 2:
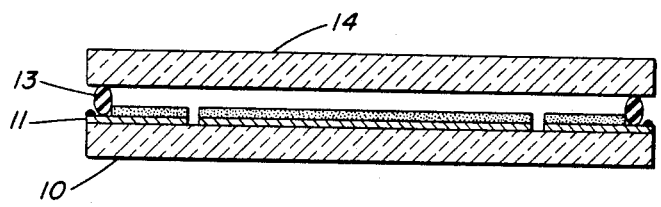

FIG. 1 is a plan view of an electrochromic device of the invention, showing the connecting electrical power circuit, FIG. 2 is a cross-sectional view of the device of FIG. 1.

With reference to FIGS. 1 and 2, 10 is a substrate or backing material overlaid with a first electrode 11. The substrate 10 and the conductive layer 11 may conveniently be provided as a unit by so-called "NESA" - glass, a commercially available product having a transparent coating of conductive layer 11, or other transparent material such as NESA glass, is deposited a layer of a persistent electrochromic material 12 for example by vacuum evaporating tungsten oxide to form a film 12 of thickness in the range of about one micron. Along the edge and in contact with film 12 is a gasket 13 formed from an electrically insulating material. As shown in FIGS. 2 and 3 the gasket 13 separates the film 12 from a glass cover plate 14 and produces a space for the gel electrolyte 15. At the edges of layer 12, two areas 16 have been removed to provide electrical separation and produce tungsten oxide counter electrodes 17.

Contact to an external potential is secured by leads 19 from a conductive strip 20 over the tin oxide layer 11 of the conducting glass, and leads 21 to counter electrodes 17. A source of dc potential 30 is coupled between the conductive films with its terminals connected to the metallic strip 20 and 21 by means of switch which may make contact with poles 32 or for reversing polarity poles 33.

The following examples illustrating particular applications of the present invention are not to be construed as a limitation of the invention except as defined in the appended claims.

EXAMPLE 1

A film of tungsten oxide about 1.0 micron in thickness is vacuum deposited on an electronically conductive NESA glass plates. Part of the deposit was removed as described. The plate was assembled in a sandwich arrangement with a sheet of glass and in face to face arrangement in a cell cavity provided by a 2 mm spacer gasket. A suitably conductive gel was provided by sulfuric acid – polyvinyl alcohol. The gel preparation comprises the addition of 20 ml of 3M $H_2SO_4$ to 5.5 gm of polyvinyl alcohol (DuPont Elvanol 70–05) at a temperature of 80° C. A clear viscous solution is formed within about 15 minutes. During this period the mixture is stirred constantly and the temperature is held at about 80°–85° C. The solution is cooled to room temperature while centrifuging to remove bubbles.

The clear liquid is poured into the empty cell cavity through one port while providing an additional port as an outlet for the displaced air. The gel exposed at the entrance port hardens in contact with air thereby providing self seal and antileak features.

The gel exhibited a conductivity of 0.30 $ohm^{-1}\ cm^{-1}$ and unexpected clarity on storage. The cell underwent 5000 cycles over a period of 20 days. The film remained transparent and the device showed no change in voltage – time curves.

EXAMPLE 2

The procedure of Example 1 was repeated in every detail except for employing 4M sulfuric acid and 20 DuPont Elvanol 70-05 to form a gel with conductivity of 0.35 $ohm^{-1}\ cm^{-1}$. The cell was submitted to 6000 cycles of continuous cycling at voltage of 0.7V.

| Example | Gel Composition | Gel Conductivity ohm cm | Cell voltage (volts) | Number Cell Cycles |
|---|---|---|---|---|
| 3 | 3M $H_2SO_4$ 30% Elvanol 70–05 | 0.19 | 0.8 | 5000 |
| 4 | 4M $H_2SO_4$ 13% PVA 125 | 0.33 | 0.7 | 10,000 |
| 5 | 5M $H_2SO_4$ 13%PVA 125 | 0.37 | 0.8 | 7500 |
| 6 | 8M $H_2SO_4$ 40% Elvanol 70–05 | 0.25 | 1.0 | 8000 |

In the foregoing examples all cells were in original condition after the number of cycles specified.

We claim:

1. A variable light transmission device comprising a layer of a persistent electrochromic material, a counter electrode comprising the same persistent electrochromic material as said layer, a semi-solid electrolyte in contact with both said layer and said counter electrode, means to form separate electrical contact with each of said layer and said counter electrode, and means to contain said layer, counter electrode and electrolyte, said means having at least a portion that is light transmitting.

2. A variable light transmission device, as in claim 1, which comprises at least two layers of a persistent electrochromic material formed from the same original deposit, wherein one of said layers is used as the counter electrode.

3. The device of claim 1 wherein the semi-solid electrolyte is a sulfuric acid-polyvinyl alcohol gel.

4. The device of claim 3 wherein the gel electrolyte has a conductance of at least that of 4M $H_2SO_4$.

5. The device of claim 2 wherein the semi-solid electrolyte is in face to face electrical contact with two separate but identical films of tungsten oxide.

6. the device of claim 2 wherein at least one of the electrodes is substantially transparent.

* * * * *